United States Patent
Tan et al.

(10) Patent No.: US 9,696,843 B2
(45) Date of Patent: Jul. 4, 2017

(54) AMOLED PIXEL CIRCUIT, A DRIVING METHOD THEREOF AND A DISPLAY DEVICE

(71) Applicants: Chengdu BOE Optoelectronics Technology Co., Ltd., Chengdu, Sichuan (CN); BOE Technology Group Co., Ltd., Beijing (CN)

(72) Inventors: Wen Tan, Beijing (CN); Xiaojing Qi, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 571 days.

(21) Appl. No.: 14/236,005

(22) PCT Filed: Dec. 16, 2013

(86) PCT No.: PCT/CN2013/089495
§ 371 (c)(1),
(2) Date: Jan. 29, 2014

(87) PCT Pub. No.: WO2014/206033
PCT Pub. Date: Dec. 31, 2014

(65) Prior Publication Data
US 2016/0246422 A1 Aug. 25, 2016

(30) Foreign Application Priority Data
Jun. 26, 2013 (CN) .......................... 2013 1 0260095

(51) Int. Cl.
*G06F 5/00* (2006.01)
*G06F 3/041* (2006.01)
(Continued)

(52) U.S. Cl.
CPC ............ *G06F 3/0416* (2013.01); *G06F 3/042* (2013.01); *G06F 3/044* (2013.01); *G06F 3/0412* (2013.01);
(Continued)

(58) Field of Classification Search
CPC ...... G06F 3/0412; G06F 3/0416; G06F 3/042; G06F 3/044
(Continued)

(56) References Cited

U.S. PATENT DOCUMENTS

2005/0099372 A1   5/2005   Nakamura et al.
2010/0097350 A1*  4/2010   Choi ....................... G06F 3/042
                                                            345/175
2011/0273397 A1*  11/2011  Hanari ................. G06F 3/0412
                                                            345/174

FOREIGN PATENT DOCUMENTS

CN     101017419 A     8/2007
CN     101726890 A     6/2010
(Continued)

OTHER PUBLICATIONS

First Office Action and search report issued by Chinese Patent Office for priority application CN 201310260095.6 mailed Nov. 3, 2014 with English translation.

*Primary Examiner* — William Boddie
*Assistant Examiner* — Leonid Shapiro
(74) *Attorney, Agent, or Firm* — Haug Partners LLP

(57) ABSTRACT

The present invention provides an AMOLED pixel circuit, a driving method thereof and a display device which can improve the integration degree of the in cell touch circuit and the AMOLED driving circuit. The AMOLED pixel circuit comprises: a light emitting module, a touching module, a controlling module and a driving amplifier module. The embodiments of the present invention are used for manufacturing the AMOLED display device.

16 Claims, 6 Drawing Sheets

(51) Int. Cl.
*G06F 3/042* (2006.01)
*G06F 3/044* (2006.01)
*G09G 3/3233* (2016.01)

(52) U.S. Cl.
CPC ... *G09G 3/3233* (2013.01); *G09G 2300/0852* (2013.01); *G09G 2300/0861* (2013.01); *G09G 2320/043* (2013.01); *G09G 2320/045* (2013.01)

(58) Field of Classification Search
USPC .......................................................... 345/173
See application file for complete search history.

(56) References Cited

FOREIGN PATENT DOCUMENTS

| CN | 102375258 A | 3/2012 |
|---|---|---|
| CN | 102402931 A | 4/2012 |
| CN | 103135846 A | 6/2013 |
| CN | 103309507 A | 9/2013 |
| CN | 103310734 A | 9/2013 |
| CN | 103325341 A | 9/2013 |
| CN | 103325342 A | 9/2013 |
| CN | 103345901 A | 10/2013 |
| CN | 203288218 U | 11/2013 |
| CN | 203288219 U | 11/2013 |
| CN | 203288220 U | 11/2013 |
| CN | 203288221 U | 11/2013 |

\* cited by examiner

US 9,696,843 B2

AMOLED PIXEL CIRCUIT, A DRIVING METHOD THEREOF AND A DISPLAY DEVICE

This application is a 371 of PCT/CN2013/089495 filed on Dec. 16, 2013, which claims priority benefits from Chinese Patent Application Number 201310260095.6 filed Jun. 26, 2013, the disclosure of which is incorporated herein by reference.

FIELD OF THE INVENTION

The present invention relates to the field of display technology, in particular to an AMOLED pixel circuit, a driving method thereof and a display device.

BACKGROUND OF THE INVENTION

With the rapid development in display technology, display devices with touch function are getting more and more popular because of the advantages such as visualization. Based on the position of the touch panel relative to the display panel, existing display devices can generally be divided into two types, i.e. on cell touch panel and in cell touch panel. Compared to the on cell touch panel, the in cell touch panel has a thinner thickness and higher light transmittance, and therefore has a wider application range.

For the current display devices, as a current light emitting device, the organic light emitting diode (OLED) is increasingly used in the field of high-performance display due to its characteristics of self-illumination, fast response, wide viewing angle, and being able to be produced on flexible substrates. OLED display devices can be divided into PMOLED (Passive Matrix driving OLED) and AMOLED (Active Matrix driving OLED) according to the driving mode. The AMOLED display device is expected to replace LCD (Liquid Crystal Display) as the next generation of new flat panel display device due its advantages of low manufacturing cost, high response speed, low power consumption, being DC driving for portable devices, large operating temperature range and so on. Therefore, AMOLED display panel with in cell touch function are more and more popular.

In the current AMOLED display panel, each OLED is driven to emit light by the driving circuit formed by a plurality of TFT (Thin Film Transistor) within the same pixel unit as the OLED located on the array substrate, so as to implement display. The in cell touch screen panel (TSP) is also formed by manufacturing the sensor and the driving circuit for sensing a touch in each pixel unit of the array substrate using the array process. If the sensor and the driving circuit of the TSP are superimposed in the AMOLED pixel unit, then a number of TFTs used as the driving circuit for sensing touch shall be added in addition to the original TFTs forming the driving circuit for display in the pixel unit, such that a certain space of the pixel unit will be additionally occupied. The free space in the pixel unit is limited, therefore the concurrent manufacture of the in cell touch panel and the AMOLED driving circuit is greatly limited, the producing difficulty is enhanced and the product quality is reduced.

SUMMARY OF THE INVENTION

The embodiments of the present invention provide an AMOLED pixel circuit, a driving method thereof and a display device, which can improve the integration degree of the in cell touch circuit and the AMOLED driving circuit, such that the in cell touch panel circuit and the AMOLED driving circuit can be manufactured concurrently.

To achieve the above object, the embodiments of the present invention utilize the following solutions.

According to one aspect of the embodiments of the present invention, an AMOLED pixel circuit comprises: a light emitting module, a touching module, a controlling module and a driving amplifier module;

The light emitting module is connected with the controlling module and a first voltage terminal and is used for performing light emitting display under the control of the controlling module;

The touching module is connected with the controlling module and a second signal line and is used for receiving an input touch signal;

The controlling module is further connected with the first signal line, the second signal line, a third signal line, a data line and a second voltage terminal, and is used for controlling the light emitting module and the touching module according to input signals on the signal lines;

The driving and amplifying module is connected with the light emitting module, the touching module, the controlling module and the second voltage terminal, and is used for driving the light emitting module and amplifying the touch signals received by the touching module.

The light emitting module further comprises:

a light emitting device, wherein a first terminal of the light emitting device is connected to the controlling module, and a second terminal of the light emitting device is connected to the first voltage terminal.

The controlling module further comprises:

A first transistor which has a gate connected to the first signal line, and a first electrode connected to the light emitting device;

A second transistor which has a gate connected to the second signal line, a first electrode connected to a second electrode of the first transistor, and a second electrode connected to the data line;

A third transistor which has a gate connected to the third signal line, a first electrode connected to the driving amplifier module, and a second electrode connected to the data line;

A fourth transistor which has a gate connected to the first signal line, and a second electrode connected to the second voltage terminal;

A first capacitor which has one terminal connected to the first terminal of the third transistor, and the other terminal connected to the second voltage terminal; and A second capacitor which has one terminal connected to the first terminal of the third transistor, and the other terminal connected to the first terminal of the fourth transistor.

Alternatively, the controlling module comprises:

A first transistor which has a gate connected to the first signal line, and a first electrode connected to the light emitting element;

A second transistor which has a gate connected to the second signal line, a first electrode connected to a second electrode of the first transistor, and a second electrode connected to the data line;

A third transistor which has a gate connected to the third signal line, a first electrode connected to the driving amplifier module, and a second electrode connected to the data line;

A fourth transistor which has a gate connected to the first signal line, and a second electrode connected to the second voltage terminal;

A first capacitor which has one terminal connected to the first electrode of the third transistor, and the other terminal connected to a first electrode of the fourth transistor; and A second capacitor which has one terminal connected to the first electrode of the fourth transistor, and the other terminal connected to the second electrode of the fourth transistor.

The touching module may comprise:

A fifth transistor which has a gate connected to the second signal line, and a first electrode connected to the first electrode of the third transistor; and A phototransistor which has an anode connected to the second voltage terminal, and a cathode connected to a second electrode of the fifth transistor.

Alternatively, the touching module comprises:

A fifth transistor which has a gate connected to the second signal line, and a first electrode connected to the first electrode of the third transistor; and A sensing electrode connected to a second electrode of the fifth transistor.

The driving and amplifying module further comprises:

A sixth transistor which has a gate connected to the first electrode of the third transistor, a first electrode connected to the second voltage terminal, and the second electrode connected to the second electrode of the first transistor.

It should be noted that, all the transistors in the AMOLED pixel circuit are N-type transistors, or all the transistors in the AMOLED pixel circuit are P-type transistors. According to another aspect of the embodiments of the present invention, a display device comprising the above AMOLED pixel circuit is provided.

According to still another aspect of the embodiments of the present invention, a driving method of the AMOLED pixel circuit comprises:

turning off the light emitting module, inputting an initialization signal to the data line, and initializing the driving and amplifying module and the touching module according to the initialization signal by the controlling module;

receiving the touch signal by the touching module;

turning of the touching module, and amplifying the touch signal and outputting it to the data line by the driving amplifier module;

pre-charging the driving and amplifying module under the control of the controlling module by the data signal input through the data line;

turning on the light emitting module, and driving the light emitting module to perform light-emitting display by the driving amplifier module.

Specifically, the driving method comprises:

An initialization stage: the first transistor is cut off to turn off the light emitting device; the fifth transistor is turned on so as to connect the touching module to the gate of the sixth transistor; the first capacitor is used as the storage capacitor for the sixth transistor; the third transistor is turned on, the second and the fourth transistors are cut off, the initialization signal is input through the data line to pre-charge the first capacitor.

A touching stage: the second transistor and the third transistor are cut off, and the touching module receives a touch signal.

A reading stage: the second transistor is turned on the third transistor and the fifth transistor are cut off, such that the touching module is turned off; and the sixth transistor amplifies the gate voltage thereof and output it to the data line.

The writing stage: the first and the fourth transistors are cut off, the second transistor and the third transistor are turned on; the gray scale current input through the data line charges the first capacitor and the gate of the sixth transistor.

The light emitting stage: the second transistor, the third transistor and the fifth transistors are cut off, the first transistor and the fourth transistor are turned on, the sixth transistor operates in the saturation region, amplifies the data signals and outputs them to the light emitting device to perform light emitting display.

The touching module receiving a touch signal comprises:

when performing a touch operation, the touching module determines to receive the touch signal based on amount of the received light of the phototransistor; or when performing a touch operation, the touching module determines to receive the touch signal based on value of the sensed capacitance formed between the sensing electrode and the user's touch terminal.

In the AMOLED pixel circuit, the driving method thereof and the display device according to embodiments of the present invention, by integrating an in cell touch circuit in the AMOLED pixel circuit, the light emitting module and the touching module can utilize in common the controlling module and the driving amplifier module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, difficulty in manufacturing the products is reduced, and the quality of the products is significantly improved.

BRIEF DESCRIPTION OF THE DRAWINGS

To more clearly explain the technical solutions in the present invention or the prior art, the drawings required to be used in description of the embodiments of the present invention or in description of the prior art will be introduced simply below. Obviously, the drawings described below are only for illustrating some embodiments of the present invention, and other drawings can be obtained according to these drawings by those having ordinary skill in the art without any creative work. In the drawings.

DETAILED DESCRIPTION OF THE EMBODIMENTS

The technical solutions of the embodiments of the present invention will be described in a clear and complete manner in conjunction with the drawings. Apparently, the described embodiments are only part of embodiments of the present invention instead of all embodiments. Based on the described embodiments, all other embodiments obtained by those having ordinary skill in the art without creative work are intended to be encompassed by the protection scope of the present invention.

The transistors adopted in all the embodiments of the present invention can be thin film transistors or field effect transistors or other devices with the same properties. As the source and the drain of a transistor adopted herein are symmetrical to each other, the source and the drain are interchangeable. In the embodiments of the present invention, in order to distinguish between the two electrodes other than the gate of the transistor, one electrode is called a source, and the other electrode is called a drain. Furthermore, the transistors can be divided into N-type transistors and P-type transistors depending upon the characteristics thereof. In the AMOLED pixel circuit according to an embodiment of the invention, all the transistors are exemplified as N-type transistors. It is readily understood that the N-type transistors are replaced with P-type transistors without creative work, which is apparent to persons skilled in the art, and such solutions are also within the protection scope of the present invention.

Figure 1:
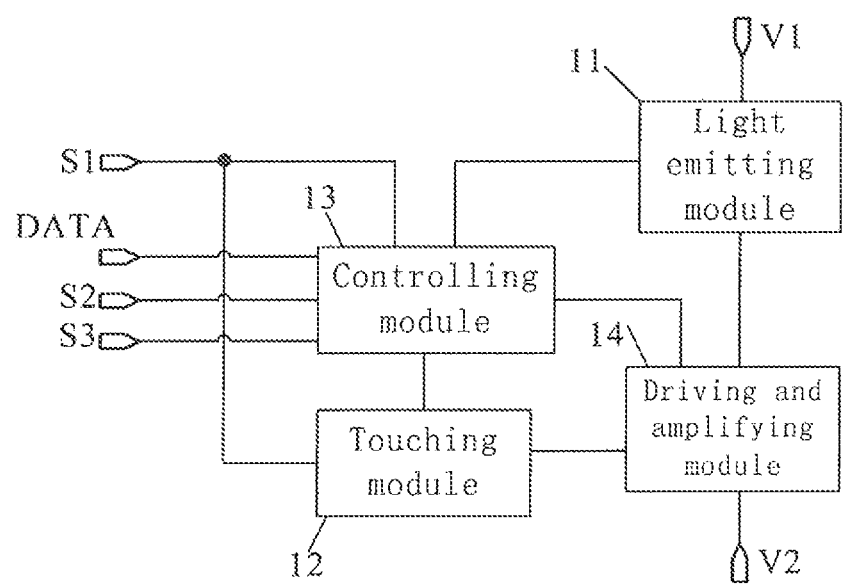
FIG. 1 is a structural block diagram of an AMOLED pixel circuit according to an embodiment of the invention.

As shown in FIG. 1, the AMOLED pixel circuit according to an embodiment of the invention comprises a light emitting module 11, a touching module 12, a controlling module 13 and a driving and amplifying module 14.

The light emitting module 11 is connected to the controlling module 13 and a first voltage terminal V1, for performing light emitting display under the control of the controlling module 13.

The touching module 12 is connected to the controlling module 13 and a second signal line S2, for receiving an input touch signal.

The controlling module 13 is further connected to the first signal line S1, a second signal line S2, a third signal line S3, a data line DATA and the second voltage terminal V2, for controlling the light emitting module 11 and the touching module 12 according to inputs signal on the signal lines.

The driving and amplifying module 14 is connected to the light emitting module 11, the touching module 12, the controlling module 13 and a second voltage terminal V2, for driving the light emitting module 11 or amplifying the touch signal received by the touching module 12.

In the AMOLED pixel circuit according to an embodiment of the present invention, by integrating an in cell touch circuit in the AMOLED pixel circuit, the light emitting module and the touching module can utilize in common the controlling module and the driving amplifier module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

A high level VDD can be input to the first voltage terminal V1, and a low level VSS can be input to the second voltage terminal V2. The data line DATA is shared by the light emitting module 11 and the touching module 12 in the AMOLED pixel circuit. This data line DATA is used for inputting display signals or touch signals to the AMOLED pixel circuit in different periods under control of the controlling module 13, wherein the display signal may be the light emitting control signal, and the touch signal may be the touch reading signal.

In the AMOLED pixel circuit according to an embodiment of the invention, all the transistors are exemplified as N-type transistors, wherein the first electrode of the N-type transistor may be the source, and the second electrode of the N-type transistor may be the drain. Apparently, when using the P-type transistor, the first electrode of the P-type transistor can be the drain, and the second electrode of the P-type transistor may be the source.

Figure 2:
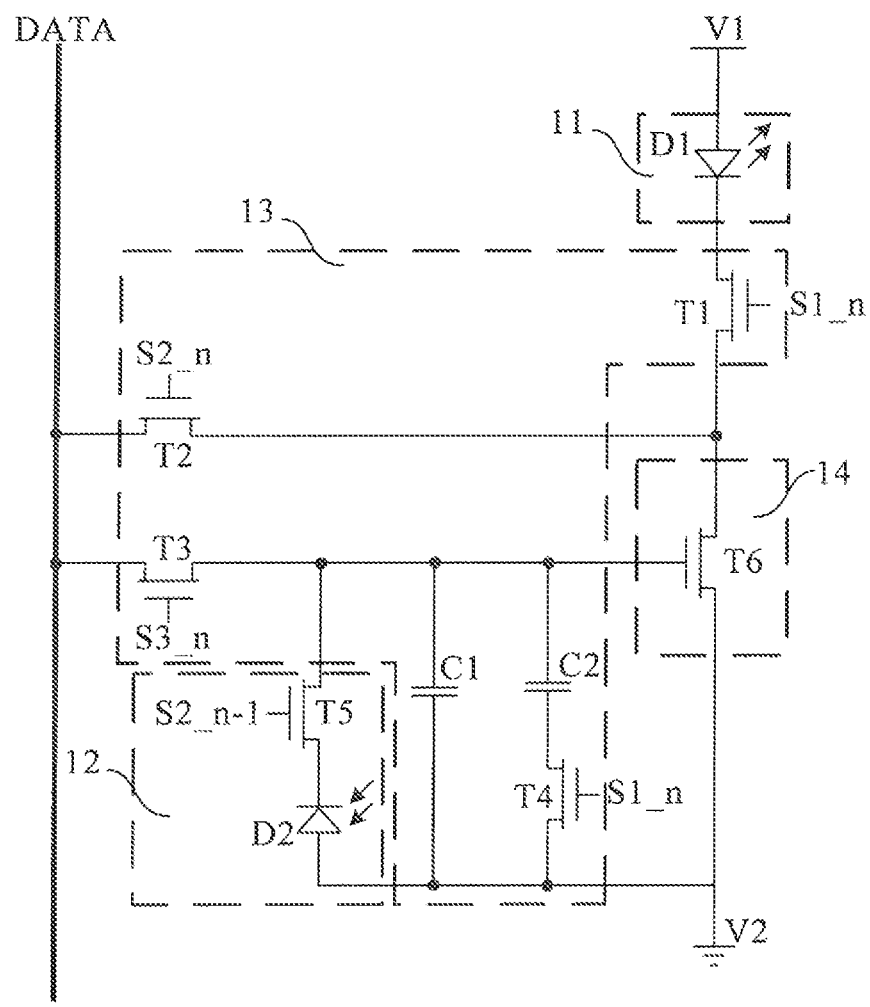
FIG. 2 is a schematic circuit diagram of an AMOLED pixel circuit according to an embodiment of the invention.

Specifically, as shown in FIG. 2, in the AMOLED pixel circuit according to an embodiment of the present invention, the light emitting module 11 may include: a light emitting device D1, one terminal thereof is connected to the controlling module 13, while the other terminal thereof is connected to the first voltage terminal V1.

In the embodiment of the present invention, the light emitting device D1 can be various current driving light emitting devices such as LED (Light Emitting Diode) or OLED (Organic Light Emitting Diode). In the embodiment of the present invention, OLED is taken as an example of the light emitting element D1.

Further, as shown in FIG. 2, the controlling module 13 may comprise:

A first transistor T1 which has a gate connected to the first signal line S1 (applied with the signal S1_$n$ shown in FIG. 2), and a first electrode connected to the light emitting device D1;

A second transistor T2 has a gate connected to the second signal line S2 (applied with the signal S2_$n$ shown in FIG. 2), a first electrode connected to a second electrode of the first transistor T1, and a second electrode connected to the data line DATA;

A third transistor T3 which has a gate connected to the third signal line S3 (applied with the signal S3_$n$ shown in FIG. 2), a first electrode connected to the driving and amplifying module 14, and a second electrode connected to the data line DATA;

A fourth transistor T4 which has a gate connected to the first signal line S1 (applied with the signal S1_$n$ shown in FIG. 2), and a second electrode connected to the second voltage terminal V2;

A first capacitor C1 has one terminal connected to the first electrode of the third transistor T3, and the other terminal connected to the second voltage terminal V2; and A second capacitor C2 has one terminal connected the first electrode of the third transistor T3, and the other terminal connected to the first electrode of the fourth transistor T4.

Figure 3:
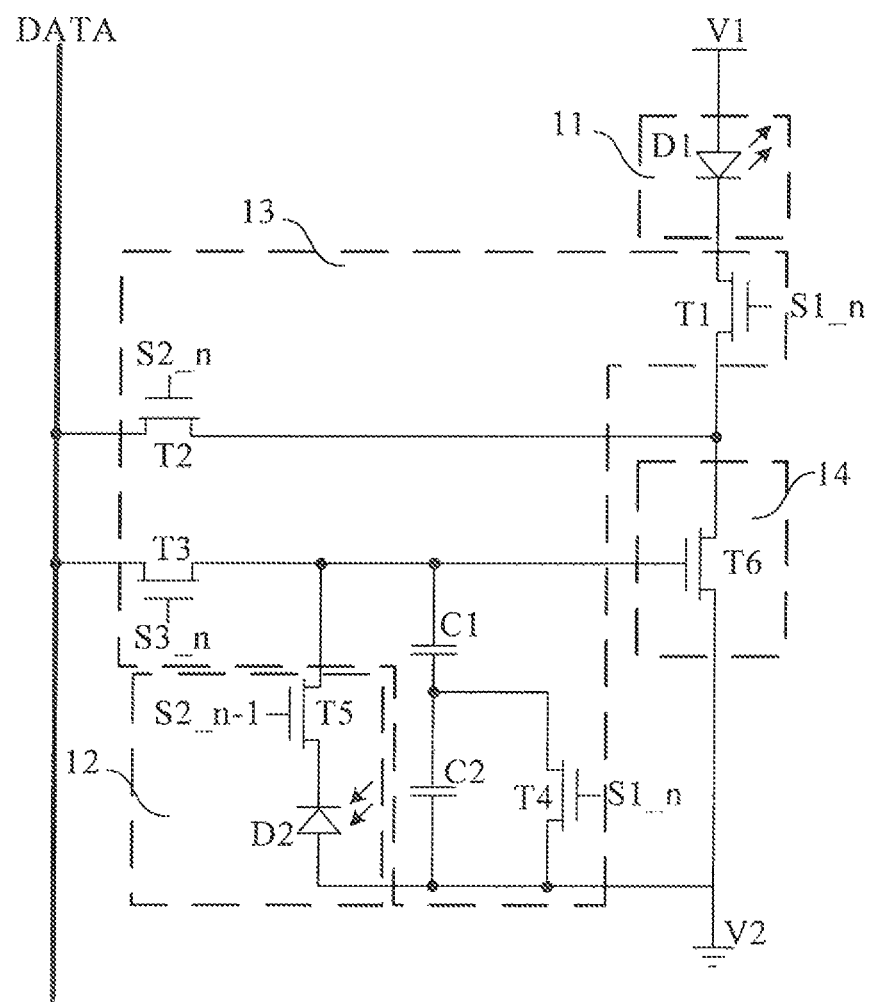
FIG. 3 is a schematic circuit diagram of another AMOLED pixel circuit according to an embodiment of the invention.

Alternatively, as shown in FIG. 3, the controlling module 13 comprises:

A first transistor T1 which has a gate connected to the first signal line S1 (applied with the signal S1_$n$ shown in FIG. 3), and a first electrode connected to the light emitting device D1;

A second transistor T2 which has a gate connected to the second signal line S2 (applied with the signal S2_$n$ shown in FIG. 3), a first electrode connected to a second electrode of the first transistor T1, and a second electrode connected to the data line DATA;

A third transistor T3 which has a gate connected to the third signal line S3 (applied with the signal S3_$n$ shown in FIG. 3), a first electrode connected to the driving and amplifying module 14, and a second electrode connected to the data line DATA;

A fourth transistor T4 which has a gate connected to the first signal line S1, and a second electrode connected to the second voltage terminal V2;

A first capacitor C1 which has one terminal connected the first terminal of the third transistor T3, and the other terminal connected to the first terminal of the fourth transistor T4; and A second capacitor C2 has one terminal connected the first electrode of the fourth transistor T4, and the other terminal connected to the second terminal of the fourth transistor T4.

It should be noted that, the controlling module 13 with the above two structures can both implement a time-sharing control of the light emitting module 11 and the touching module 12 by adjusting the input timing sequence of the display signals and the touch signals. In the practical application, the above two structures of the controlling module 13 can be selected or replaced according to actual needs.

Further, as shown in FIG. 2, the touching module 12 comprises:

A fifth transistor T5 which has a gate connected to the second signal line S2 (applied with the signal S2_$n$−1 shown in FIG. 2), and a first electrode thereof to the first electrode of the third transistor T3; and A phototransistor D2 which has an anode connected to the second voltage terminal V2, and a cathode connected to the second electrode of the fifth transistor T5.

With such a structure of the light sensitive touching module 12, when the user performs a touch operation, amount of the light received by the phototransistor D2 will change due to the effect of shading when the user touches the panel. The phototransistor D2 will produce different leakage currents based on different amounts of received light. By measuring the differences in the leakage currents of the phototransistors D2 in different pixel regions of the display panel, the touch position can be detected accurately.

The touching module 12 in the AMOLED pixel circuit according to the embodiment of the present invention is not limited to the light sensitive touching module, other well known structures of touch circuit can be applied to the present invention. For example, in the AMOLED pixel circuit shown in FIG. 4, the touching module 12 may comprise:

A fifth transistor T5 which has a gate connected to the second signal line S2 (applied with the signal S2_$n$−1 shown in FIG. 2), and a first electrode connected to the first electrode of the third transistor T3; and A sensing electrode C3 connected to the second electrode of the fifth transistor T5.

With such a structure of the capacitive touching module 12, when the user performs a touch operation, value of the sensed capacitance formed between the user's finger or other touch means and the sensing electrode C3 will change. By measuring the position where the value of the sensed capacitance is changed, the touch position can also be detected accurately.

In the practical application, the above two structures of the touching module 12 can be selected or replaced according to actual needs.

Figure 4:
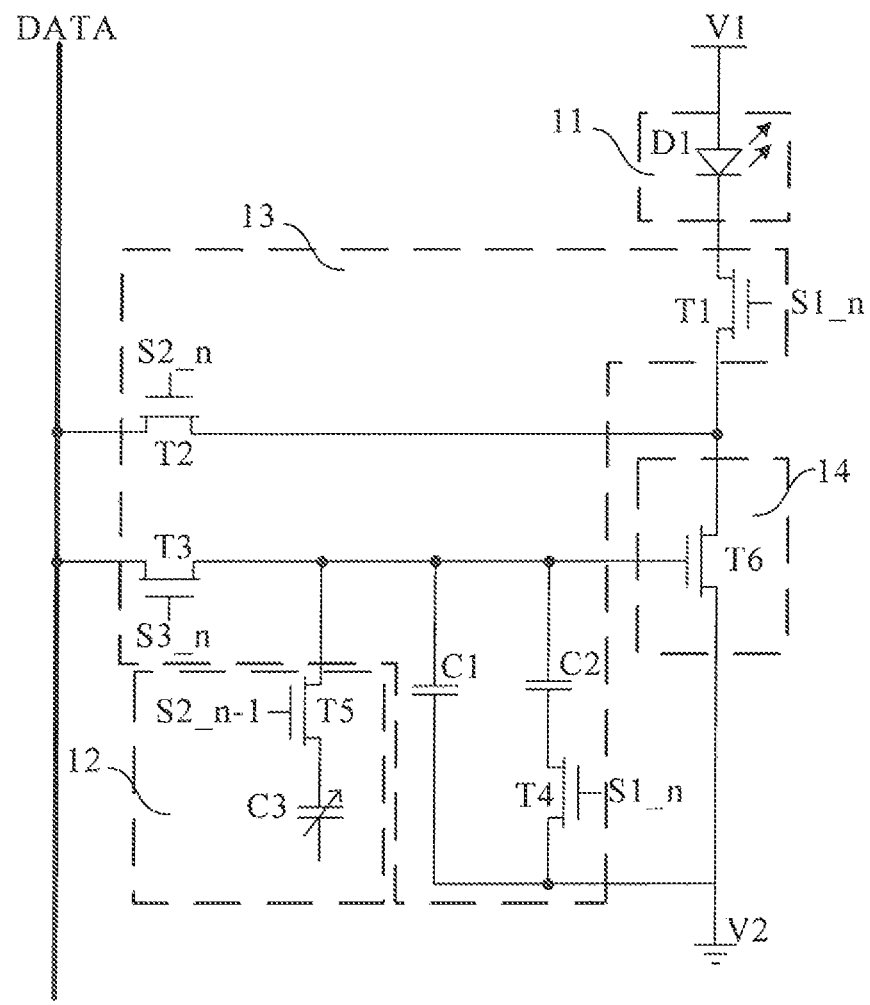
FIG. 4 is a schematic circuit diagram of still another AMOLED pixel circuit according to an embodiment of the invention.

Apparently, the capacitive touching module with the above structure can be combined with the above two kinds of controlling modules. In the AMOLED pixel circuit shown in FIG. 4 the controlling module 12 has the same structure as that in FIG. 2; or in the AMOLED pixel circuit shown in FIG. 5, the same capacitive touching module as that in FIG. 4 is adopted, and the controlling module 12 may have the same structure as that in FIG. 3.

In the AMOLED pixel circuit shown in FIG. 2, the driving and amplifying module 14 may comprise:

A sixth transistor T6 which has a gate connected to the first electrode of the third transistor T3, a first electrode connected to the second voltage terminal V2, and the second electrode connected to the second electrode of the first transistor T1.

With the AMOLED pixel circuit according to the embodiment of the present invention, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

An embodiment of the present invention further provides a display device including an organic light emitting display or other displays. The display device comprises any one of the above AMOLED pixel circuits. The display device may comprise a plurality of AMOLED pixel unit arrays, each AMOLED pixel unit comprises any one of the above AMOLED pixel circuits. The display device provides the same advantageous effects as the AMOLED pixel circuits provided in the above embodiments of the present invention.

Specifically, the display device according to the embodiments of the present invention may be a display device comprising a current driving light emitting device such as a LED or OLED display.

The display device according to the embodiments of the present invention comprises the above AMOLED pixel circuit, wherein by integrating an in cell touch circuit in the AMOLED pixel circuit, the light emitting module and the touching module can utilize in common the controlling module and the driving amplifier module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

A driving method of the AMOLED pixel circuit according to an embodiment of the present invention can be applied to various AMOLED pixel circuits according to the above embodiments, the method comprises the following steps:

S101, turning off the light emitting module, inputting an initialization signal to the data line, and initializing the driving and amplifying module and the touching module according to the initialization signal by the controlling module;

S102, receiving a touch signal by the touching module;

S103, turning off the touching module, and amplifying the touch signal and outputting it to the data line by the driving amplifier module;

S104, pre-charging the driving and amplifying module under the control of the controlling module by the data signal input through the data line; and S105, turning on the light emitting module, and driving the light emitting module to perform light-emitting display by the driving, amplifier module.

According to the driving method of the AMOLED pixel circuit according to the embodiment of the present invention, by integrating an in cell touch circuit in the AMOLED pixel circuit, the light emitting module and the touching module can utilize in common the controlling module and the driving amplifier module; in other words, the controlling module and the driving and amplifying module are time division multiplexed to drive the light emitting module and the touching module. Thus, by adjusting the timing sequence of the touch signals and the display signals, the light emitting module and the touching module can be driven in a time-sharing manner without an additional touch driving circuit. Therefore the in cell touch circuit and the AMOLED driving circuit can be manufactured concurrently in the limited space of the pixel unit, the difficulty in manufacturing the products is reduced, and the quality of the products is significantly improved.

Figure 6:
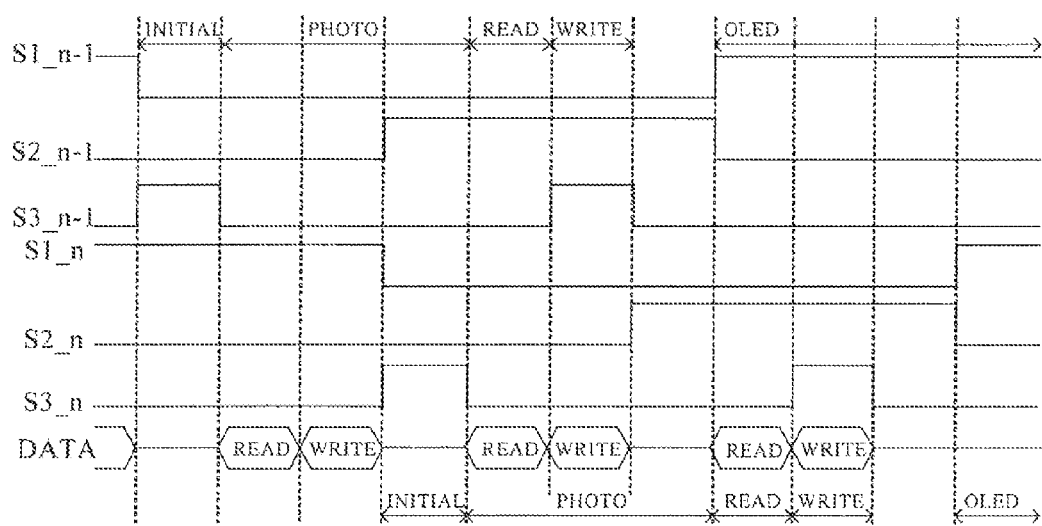
FIG. 6 is a schematic view of signal waveforms for driving the AMOLED pixel circuit shown in FIG. 2.

Hereinafter, the driving method of the AMOLED pixel circuit according to an embodiment of the present invention will be described taking the AMOLED pixel circuit shown in FIG. 2 as an example, wherein the timing waveform of the signal on each data line for driving the AMOLED pixel circuit is shown in FIG. 6. Note that, in the embodiments of the present invention, each of the gates of the first transistor T1 and the fourth transistor T4 is connected to the first signal line S1 and is supplied with an input signal $S1\_n$; the gates of the second transistor T2 and the fifth transistor T5 are connected to the second signal line S2, wherein a signal $S2\_n$ is applied to the gate of the second transistor T2, and a signal $S2\_n-1$ is applied to the gate of the fifth transistor T5, the waveform of the signal $S2\_n$ is obtained by delaying the waveform of the signal $S2\_n-1$; the gate of the third transistor T3 is connected to the third signal line S3 and is supplied with an input signal $S3\_n$.

In the AMOLED pixel circuit shown in FIG. 2, all the transistors may be N-type transistors or P-type transistors. In the present embodiment, all the transistors are illustrated as N-type transistors. Obviously, when adopting the P-type transistors, the same function can be implemented by adjusting the high and low levels of the timing control signals.

A $n-1^{th}$ period signals and the $n^{th}$ period signals both exist in the timing waveform view of the AMOLED pixel circuit as shown in FIG. 6, the $n^{th}$ period signals can be obtained by delaying the $n-1^{th}$ period signals. Specifically, the driving method of the AMOLED pixel circuit according to an embodiment of the present invention comprises: An initialization stage (INITIAL): in this stage, the signal $S1\_n$ and signals $S2\_n$ are in low level, and the signal $S3\_n$ and the signal $S2\_n-1$ are in high level. At this time, the first transistor T1 is cut off to turn off the light emitting element D1; the fifth transistor T5 is turned on, so as to connect the touching module 12 to the gate of the sixth transistor T6; the first capacitor C1 is used as the storage capacitor for the sixth transistor T6; the third transistor T3 is turned on, the second transistor T2 and the fourth transistor T4 are cut off, the initialization signal is input through the data line DATA to pre-charge the first capacitor C1.

By initializing the touching module 12, the first capacitor C1 can be pre-charged, such that the sixth transistor T6 is ensured to be operated in the saturation amplification state in the next stage.

A touching stage (PHOTO): in this stage, the signals $S1\_n$, $S2\_n$ and $S3\_n$ are in low level, the signal $S2\_n-1$ is in high level; the second transistor T2 and the third transistor T3 are cut off, the fifth transistor T5 is kept turning on, and the touching module 12 receives a touch signal.

Figure 5:
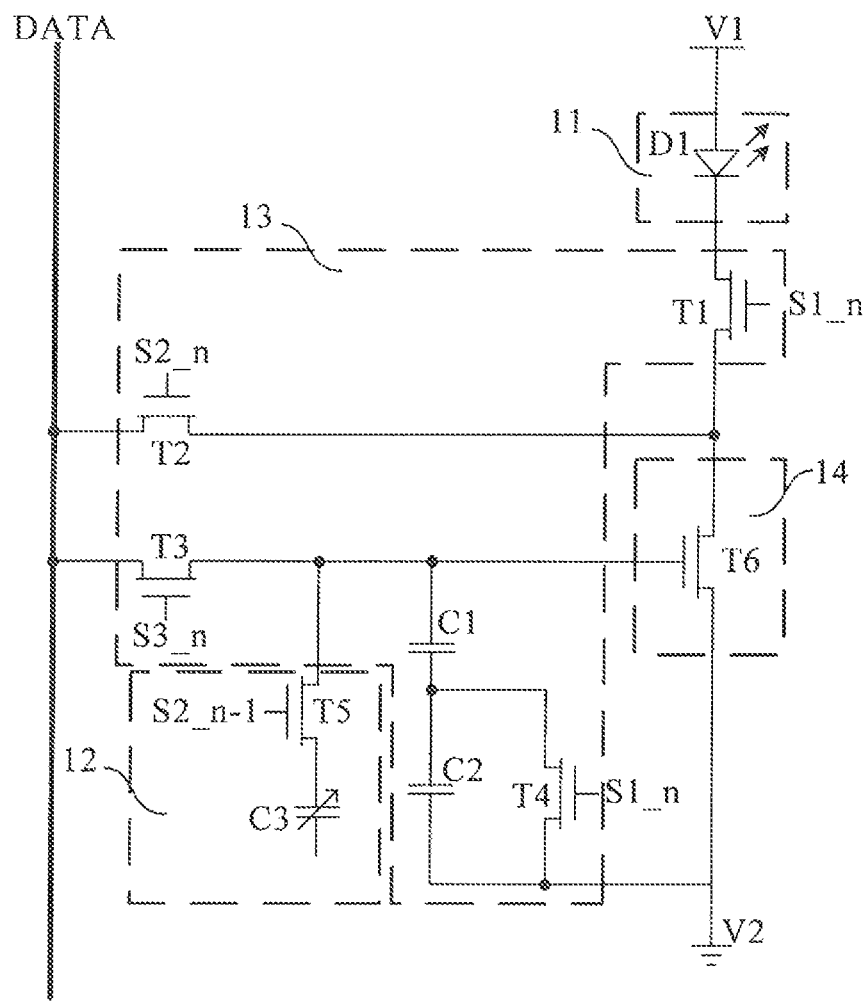
FIG. 5 is a schematic circuit diagram of yet another AMOLED pixel circuit according to an embodiment of the invention.

The structure of the touching module 12 is shown in FIG. 2 or FIG. 3. The touching module 12 comprises a phototransistor D2. With such a structure of the light sensitive touching module 12, when the user performs a touch operation, amount of the light received by the phototransistor D2 will change due to the effect of shading when the user touches the panel. The phototransistor D2 will produce different leakage currents based on different amounts of received light. By measuring the differences in the leakage currents of the phototransistors D2 in different pixel regions of the display panel, the touch position can be detected accurately. Alternatively, the structure of the touching module 12 is shown in FIG. 4 or FIG. 5. The touching module 12 comprises a sensing electrode C3. With such a structure of the capacitive touching module 12, when the user performs a touch operation, value of the sensed capacitance formed between the sensing electrode C3 and the user's finger or other touch means will change. By measuring the position where the value of the sensed capacitance value is changed, the touch position can also be detected accurately.

In the practical application, the touching module 12 of above two structures can be selected or replaced according to actual needs.

In the present embodiment, the touching stage will be described in detail taking the light sensitive touching module as an example. When the second transistor T2 and the third transistor T3 are cut off, the phototransistor D2 detects the touch state of the display panel. When the display panel is touched by a user's finger, the phototransistor D2 cannot be irradiated by an external light source and amount of the received light of the phototransistor D2 is reduced, resulting in lower light sensitive leakage current. In this stage, the voltage level on the first capacitor C1 has less change due to the leakage current of D2. When the display panel is not touched, the external light source can irradiate onto the phototransistor D2, the phototransistor D2 receives larger light amount and produce a larger light sensitive leakage current. In this stage, the voltage level on the first capacitor C1 has larger change due to the leakage current of D2. Therefore, if the display panel is touched, the gate voltage of the sixth transistor T6 (equivalent to an amplifier transistor) has little changes from the initial voltages; and if the display panel is not touched, the gate voltage of the sixth transistor T6 has large changes from the initial voltages.

A reading stage (READ): In this stage, the signal $S1\_n$ in is in low level; the signal $S2\_n$ is in high level, and the signals $S3\_n$ and $S2\_n-1$ are in low level. The second transistor T2 is turned on, the third transistor T3 and the fifth transistor T5 are cut off, such that the touching module 12 is turned off. The sixth transistor T6 amplifies its gate voltage and outputs it to the data line DATA.

At this time, the data line DATA is used as the read line for the output voltage of the touch result. The sixth transistor T6 takes the amplification function, amplifies its gate voltage and outputs it to the data line DATA, such that the touch result is output to the touch signal read circuit provided outside the display panel.

Above three stages (including the initialization stage, the touching stage and the reading stage) are the implementation procedure of the touch function, whereby implementing the touch function by detecting and reading the touch signals.

A writing stage (WRITE): in this stage, the signals $S1\_n$ and $S2\_n-1$ are in low level, and the signals $S2\_n$ and $S3\_n$ are in high level. At this time, the first transistor T1, the fourth transistor T4 and the fifth transistor T5 are cut off, the second transistor T2 and the third transistor T3 are turned on. The gray scale current input through the data line DATA charges the first capacitor C1, and the data voltage is applied to the gate of the sixth transistor T6.

Since the second transistor T2 and the third transistor T3 are turned on, the gate and drain of the sixth transistor T6 are directly connected, at this time T6 can be considered as a diode. The OLED is a current driving element, the data line DATA inputs a gray scale current $I_{DATA}$; after being charged by $I_{DATA}$ the sixth transistor T6 goes into the saturation state. The gate level of T6 is determined by the input gray scale current $I_{DATA}$ and the first capacitor C1 (the storage capacitor) is charged to the gate level of T6.

$$I_{DATA} = \frac{1}{2} \cdot k \cdot (V_{GS\_T6} - V_{TH\_T6})^2, \text{ and } V_{C1} =$$

$$V_{GS\_T6} = \sqrt{\frac{2}{k} \cdot I_{DATA}} + V_{TH\_T6}.$$

$I_{OLED}$ is the current flowing through the OLED, k is the current coefficient, $V_{GS\_T6}$ is the gate-source voltage of the sixth transistor T6, $V_{TH\_T6}$ is the threshold voltage of the sixth transistor T6, $V_{C1}$ is the voltage on the first capacitor C1.

A light emitting stage (OLED): in this stage, the signals S2_n, S3_n and S2_n−1 are in low level, and the signal S1_n is in high level. At this time, the second transistor T2, the third transistor T3 and the fifth transistor T5 are cut off, the first transistor T1 and the fourth transistor T4 are turned on, the sixth transistor T6 operates in the saturation region and drives the light emitting device D1 to perform light emitting display.

As compared to the writing stage, the storage capacitor C1 changes from $C_{ST}=C_1$ to $C'_{ST}=C_1+C_2$.

The gate voltage of the sixth transistor T6 changes from $$V_{GS} = \frac{Q}{C_1} \text{ to } V'_{GS} = \frac{Q}{C_1+C_2}.$$

The drain current of the sixth transistor T6 is $I_{DS\_T6}=I_{OLED}=\frac{1}{2} \cdot k \cdot (V'_{GS}-V_{TH\_T6})^2$.

Comparing $I_{OLED}$ and $I_{DATA}$:

$$I_{OLED} = \frac{1}{2} \cdot k \cdot \left(\frac{Q}{C_1+C_2} - V_{TH\_T6}\right)^2$$

$$I_{DATA} = \frac{1}{2} \cdot k \cdot \left(\frac{Q}{C_1} - V_{TH\_T6}\right)^2$$

$$\frac{I_{DATA}}{I_{OLED}} = \frac{\frac{1}{2}k\left(\frac{Q}{C_1} - V_{TH\_T6}\right)^2}{\frac{1}{2}k\left(\frac{Q}{C_1+C_2} - V_{TH\_T6}\right)^2} =$$

$$\left(\frac{\left(\frac{Q}{C_1} - V_{TH\_T6}\right)}{\frac{Q}{C_1+C_2} - V_{TH\_T6}}\right)^2 = \left(\frac{\frac{Q}{C_1+C_2} + \frac{C2}{C1} \cdot \frac{Q}{C1+C2} - V_{TH\_T6}}{\frac{Q}{C_1+C_2} - V_{TH\_T6}}\right)^2$$

$$= \left(\frac{\frac{C2}{C1} \cdot \frac{Q}{C1+C2}}{\frac{Q}{C_1+C_2} - V_{TH\_T6}} + 1\right)^2 =$$

-continued $$\left(\frac{\frac{C2}{C1} \cdot V'_{GS}}{V'_{GS} - V_{TH\_T6}} + 1\right)^2 = \left(\frac{C2}{C1} \cdot \frac{\sqrt{\frac{2I_{OLED}}{k1}} + V_{TH\_T6}}{\sqrt{\frac{2I_{OLED}}{k1}}} + 1\right)^2$$

$$= \left(\frac{C2}{C1} \cdot \frac{V_{TH\_T6}\sqrt{k1}}{\sqrt{2I_{OLED}}} + \frac{C1}{C2} + 1\right)^2 =$$

$$\frac{k1}{2}\left(\frac{C2V_{TH\_T6}}{C1}\right)^2 \left[\frac{1}{\sqrt{I_{OLED}}} + \left(1 + \frac{C1}{C2}\right)\frac{\sqrt{2}}{V_{TH\_T6}\sqrt{k1}}\right]^2 =$$

$$a\left(\frac{1}{\sqrt{I_{OLED}}} + b\right)^2$$

wherein $$a = \frac{k1}{2}\left(\frac{C2 \cdot V_{TH\_T6}}{C1}\right)^2, b = \left(1 + \frac{C1}{C2}\right)\frac{\sqrt{2}}{V_{TH\_T6}\sqrt{k1}},$$

k1 is the body current coefficient of the transistor T6, $$k1 = \mu_1 C_{ox} \frac{W1}{L1}.$$

Therefore, $I_{DATA}=a \cdot (1+b\sqrt{I_{OLED}})^2 => \sqrt{I_{OLED}}=1/b\sqrt{a} \cdot \sqrt{I_{DATA}}-1/b$.

The square root of $I_{OLED}$ has a linear relationship with the square root of $I_{DATA}$. $I_{OLED}$ will change positively as $I_{DATA}$ changes. By adjusting the input gray scale driving currents of $I_{DATA}$ of external driving ICs, $I_{OLED}$ and $I_{DATA}$ will have a linear relationship therebetween, such that the OLED pixels can perform gray scale display.

The current scaling ratio $I_{DATA}/I_{OLED}$ changes with $I_{OLED}$ and has an inverse relationship with $I_{OLED}$. That is, in low gray scales, when the driving current $I_{OLED}$ for a pixel is very low, a larger $I_{DATA}$ can be obtained for the larger current scaling ratio, so as to speed up charging of the storage capacitor; in high gray scales, when the driving current $I_{OLED}$ for a pixel is large, a larger $I_{DATA}$ can be maintained for the smaller current scaling ratio, such that the charging speed of the storage capacitor can be ensured while not increasing the driving consumption due to an excessive $I_{DATA}$. In this way, the light emitting device D1 can keep emitting light until the next frame.

It should be noted that, the above driving method of the AMOLED pixel circuit is only illustrated with reference to the AMOLED pixel circuit shown in FIG. 2. The driving method of the AMOLED pixel circuit according to the embodiment of the present invention may also be applied to the AMOLED pixel circuit shown in any one of FIGS. 3-5, and the driving procedure thereof may be referred to the above embodiments and will not be described in detail.

With the driving method of the AMOLED pixel circuit according to the embodiment of the present invention, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

It can be readily understood by persons skilled in the art that all or part of steps of the above method can be implemented by hardware related to program instructions, the program can be stored in a computer readable storage medium and said steps of the method embodiment are performed when the program is executed; the storage medium includes the medium which can store program codes, such as ROM, RAM, magnetic disk, or optical disk.

The above descriptions are only specific embodiments of the present invention, but the protection scope of the present invention is not limited thereto. Any change or substitution that is readily conceivable to those skilled in the art within the technical scope of disclosure of the present invention is intended to be encompassed by the protection scope of the present invention. The protection scope of the present invention should be defined by the protection scope of the present invention.

The invention claimed is:

1. An AMOLED pixel circuit, comprising:
    a light emitting module,
    a touching module,
    a controlling module and
    a driving amplifier module;
    the light emitting module is connected with the controlling module and a first voltage terminal and is used for performing light emitting display under the control of the controlling module;
    the touching module is connected with the controlling module and a first signal line and is used for receiving an input touch signal;
    the controlling module is further connected with the first signal line, a second signal line, a third signal line, a data line and a second voltage terminal, and is used for controlling the light emitting module and the touching module according to input signals on the signal lines;
    wherein the control module comprises:
        a first transistor which has a gate directly connected to the first signal line, and a first electrode directly connected to the light emitting module;
        a second transistor which has a gate directly connected to the second signal line, a first electrode directly connected to a second electrode of the first transistor, and a second electrode directly connected to the data line;
        a third transistor which has a gate directly connected to the third signal line, a first electrode directly connected to the driving amplifier module, and a second electrode directly connected to the data line;
        a fourth transistor which has a gate directly connected to the first signal line, a first electrode directly connected to the second electrode of the first transistor, and a second electrode directly connected to the driving amplifier module; and
    the driving and amplifying module is connected with the light emitting module, the touching module, the controlling module and the second voltage terminal, and is used for driving the light emitting module and amplifying the touch signals received by the touching module.

2. The AMOLED pixel circuit according to claim 1, wherein the light emitting module comprises:
    a light emitting device, wherein a first terminal of the light emitting module is connected to the controlling module, and a second terminal of the light emitting module is connected to the first voltage terminal.

3. The AMOLED pixel circuit according to claim 2, wherein the controlling module further comprises:
    a first capacitor which has one terminal connected to the first terminal of the third transistor, and the other terminal connected to the second voltage terminal; and
    a second capacitor which has one terminal connected to the first terminal of the third transistor, and the other terminal connected to a first terminal of the fourth transistor.

4. The AMOLED pixel circuit according to claim 2, wherein the controlling module further comprises:
    a first capacitor which has one terminal connected to the first electrode of the third transistor, and the other terminal connected to a first electrode of the fourth transistor; and
    a second capacitor which has one terminal connected to the first electrode of the fourth transistor, and the other terminal connected to the second electrode of the fourth transistor.

5. The AMOLED pixel circuit according to claim 3, wherein the touching module comprises:
    a fifth transistor which has a gate connected to the second signal line, and a first electrode connected to the first electrode of the third transistor; and
    a phototransistor which has an anode connected to the second voltage terminal, and a cathode connected to a second electrode of the fifth transistor.

6. The AMOLED pixel circuit according to claim 3, wherein the touching module comprises:
    a fifth transistor which has a gate connected to the second signal line, and a first electrode connected to the first electrode of the third transistor; and
    a sensing electrode connected to a second electrode of the fifth transistor.

7. The AMOLED pixel circuit according to claim 3, wherein the driving and amplifying module comprises:
    a sixth transistor which has a gate connected to the first electrode of the third transistor, a first electrode connected to the second voltage terminal, and the second electrode connected to the second electrode of the first transistor.

8. The AMOLED pixel circuit according to claim 2, wherein all the transistors in the AMOLED pixel circuit are N-type transistors, or all the transistors in the AMOLED pixel circuit are P-type transistors.

9. A display device comprising the AMOLED pixel circuit according to claim 1.

10. A method of driving the AMOLED pixel circuit according to claim 1, the method comprising:
    an initialization stage in which the light emitting module is turned off, an initialization signal is input to the data line, and the controlling module initialize the driving and amplifying module and the touching module according to the initialization signal;
    a touching stage in which the touching module receive a touch signal;
    a reading stage in which the touching module is turned off, and the driving and amplifying module amplify the touch signal and output it to the data line;
    a writing stage in which the driving and amplifying module is pre-charged under the control of the controlling module by the data signal input through the data line; and a light emitting stage in which the light emitting module is turned on, and the driving and amplifying module drive the light emitting module to perform light-emitting display.

11. The driving method according to claim 10, wherein:
in the initialization stage: the first transistor is cut off to turn off the light emitting device; the fifth transistor is turned on so as to connect the touching module to the gate of the sixth transistor; the first capacitor is used as the storage capacitor for the sixth transistor; the third transistor is turned on, the second and the fourth transistors are cut off, the initialization signal is input through the data line to pre-charge the first capacitor;
in the touching stage: the second transistor and the third transistor are cut off, and the touching module receives a touch signal;
in the reading stage: the second transistor is turned on, the third transistor and the fifth transistor are cut off, such that the touching module is turned off, and the sixth transistor amplifies the gate voltage thereof and output it to the data line;
in the writing stage: the first and the fourth transistors are cut off, the second transistor and the third transistor are turned on; the gray scale current input through the data line charges the first capacitor and the gate of the sixth transistor; and
in the light emitting stage: the second transistor, the third transistor and the fifth transistors are cut off, the first transistor and the fourth transistor are turned on, the sixth transistor operates in the saturation region, so as to drive the light emitting device to perform light emitting display.

12. The driving method according to claim 10, wherein the touching module receiving a touch signal comprises:
when performing a touch operation, the touching module determines to receive the touch signal based on amount of the received light of the phototransistor; or
when performing a touch operation, the touching module determines to receive the touch signal based on value of the sensed capacitance formed between the sensing electrode and the user's touch terminal.

13. The AMOLED pixel circuit according to claim 4, wherein the touch module comprises:
a fifth transistor which has a gate connected to the second signal line, and a first electrode connected to the first electrode of the third transistor; and
a phototransistor which has an anode connected to the second voltage terminal, and a cathode connected to a second electrode of the fifth transistor.

14. The AMOLED pixel circuit according to claim 4, wherein the touch module comprises:
a fifth transistor which has a gate connected to the second signal line, and a first electrode connected to the first electrode of the third transistor; and
a sensing electrode connected to a second electrode of the fifth transistor.

15. The AMOLED pixel circuit according to claim 4, wherein the driving amplifier module comprises:
a sixth transistor which has a gate connected to the first electrode of the third transistor, a first electrode connected to the second voltage terminal, and the second electrode connected to the second electrode of the first transistor.

16. The driving method according to claim 11, wherein the touching module receiving a touch signal comprises:
when performing a touch operation, the touching module determines to receive the touch signal based on amount of the received light of the phototransistor; or
when performing a touch operation, the touching module determines to receive the touch signal based on value of the sensed capacitance formed between the sensing electrode and the user's touch terminal.

* * * * *